W. C. HALE.
Millstone-Dress.

No. 221,727. Patented Nov. 18, 1879.

UNITED STATES PATENT OFFICE.

WILLIAM C. HALE, OF AUSTIN'S SPRINGS, TENNESSEE.

IMPROVEMENT IN MILLSTONE-DRESSES.

Specification forming part of Letters Patent No. 221,727, dated November 18, 1879; application filed March 4, 1879.

*To all whom it may concern:*

Be it known that I, W. C. HALE, of Austin's Springs, in the county of Washington and State of Tennessee, have invented certain new and useful Improvements in Millstone-Dresses; and I do hereby declare the following to be a full, clear, and exact description of the invention, such as will enable others skilled in the art to which it pertains to make and use it, reference being had to the accompanying drawings, which form part of this specification.

My invention relates to an improvement in millstone-dresses; and it consists in the combination of radial and tangential furrows, which overlap each other at the eye of the stone, and which are widest at their ends and contracted at their centers, whereby the grain is taken freely into the furrows, is held back by the contractions until it is thoroughly ground, and is then quickly discharged.

Figure 1:
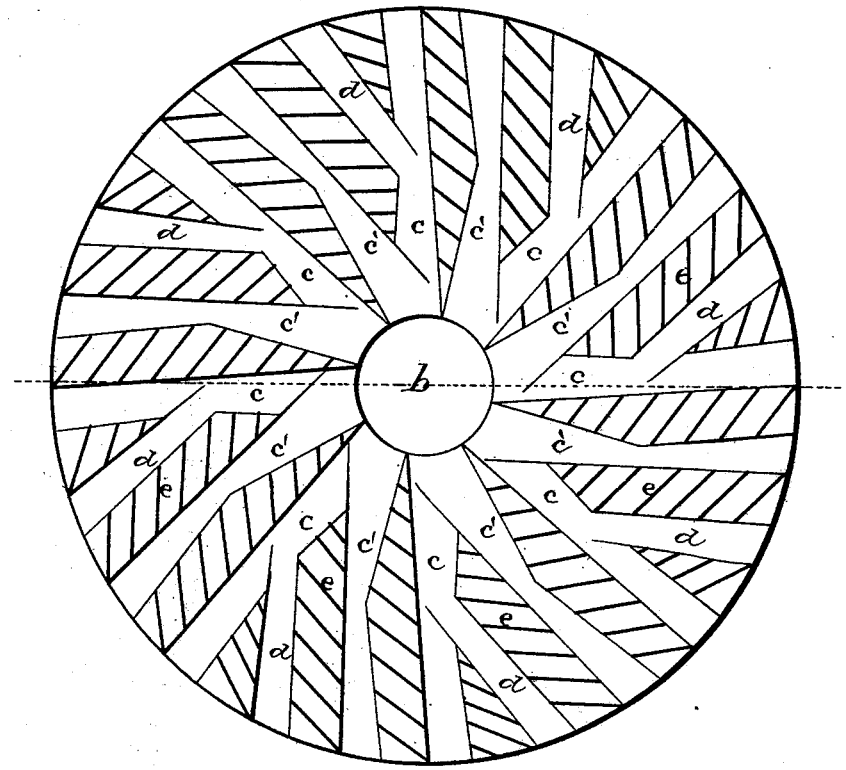
Figure 2:
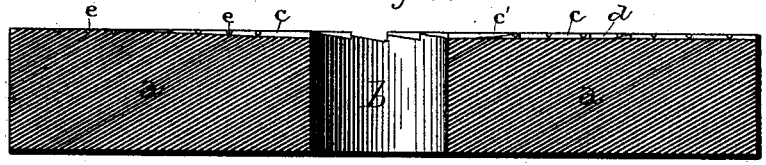

Figure 1 is a plan view of my invention, and Fig. 2 is a vertical section of the same.

*a* represents the stone, and *b* its eye. Running outward from this eye are the radial furrows *c*, and in between the radial furrows are the tangential furrows *c'*, which overlap the ends of the radial furrows at the eye, as shown. By thus making the furrows overlap each other at the eye a larger receiving-space is formed, so that the grain to be ground will flow readily and rapidly into the stone.

In order that the grain may not pass outward too rapidly before it is ground, the furrows *c c'* are contracted at their centers, so as to hold the grain back until it is thoroughly ground, and then after the grain has been ground, owing to the fact that the outer ends of the furrows are widened out, it passes rapidly out from between the stones. By thus having the furrows widest at their ends they serve to balance the stone, prevent the grain from heating, and not only increase the grinding capacity of the stones, but increase the yield of flour very materially.

Leading from the radial furrows, at or near their centers, are the half-furrows, *d*, which are also made widest at their outer ends, and serve to help free the furrows *c* after the grain has been ground.

Running circularly around the stone, in between the other furrows, are the small furrows *e*, which serve their usual function.

Having thus described my invention, I claim—

A millstone-dress consisting of the radial and tangential furrows *c c'*, made widest at their ends and narrowest at their centers, and running into each other at the eye of the stone, as shown, whereby the grain freely enters into the furrows at their inner ends, is held back by the contraction at their centers until sufficiently reduced, and then given a speedy discharge, substantially as set forth.

In testimony that I claim the foregoing I have hereunto set my hand this 22d day of February, 1879.

WILLIAM C. HALE.

Witnesses:
H. H. CRANCH,
S. S. CRUMLEY.